United States Patent [19]
Thiele et al.

[11] Patent Number: 5,958,208
[45] Date of Patent: Sep. 28, 1999

[54] PROCESS FOR THE COMBINED ELECTROCHEMICAL PRODUCTION OF SODIUM PEROXIDE DISULPHATE AND SODA LYE

[75] Inventors: Wolfgang Thiele; Knut Wildner, both of Eilenburg, Germany

[73] Assignee: Eilenburger Elecktrolyse-und UmweltTechnik GmbH, United Kingdom

[21] Appl. No.: 09/000,459
[22] PCT Filed: Aug. 14, 1996
[86] PCT No.: PCT/EP96/03596
  § 371 Date: Feb. 6, 1998
  § 102(e) Date: Feb. 6, 1998
[87] PCT Pub. No.: WO97/07262
  PCT Pub. Date: Feb. 27, 1997

[30] Foreign Application Priority Data

Aug. 17, 1995 [DE] Germany .......................... 195 30 218
Jul. 20, 1996 [DE] Germany .......................... 196 29 381

[51] Int. Cl.$^6$ ................. C25B 1/28; C25B 1/16
[52] U.S. Cl. .......................... 205/471; 205/466; 205/510
[58] Field of Search ................... 205/471, 466, 205/510

[56] References Cited

U.S. PATENT DOCUMENTS 4,144,144  3/1979  Radimer et al. ......................... 204/82
5,445,717  8/1995  Kärki et al. .............................. 205/471

FOREIGN PATENT DOCUMENTS 2375344  1/1978  France .
4326539  2/1995  Germany .
66997    4/1973  Luxembourg .

OTHER PUBLICATIONS

Derwent WPI; Title: Ammonia or AQ. Alkali Solution and Peroxodisulphate Preparation . . . Using . . . Sulphur &/or Nitrogen; Assignee: BASF AG (BADI); Inventors: Haberman W, Meyer J: DE 4326539 Feb. 9, 1993.

Derwent WPI; Title: Direct Electrolysis Prodn. of Sodium Peroxy–Disulphate . . . Used . . . for Printed Circuits; Assignee: FMC Corp (FMCC); Inventor: Radimer KJ; DE 2757861A Jun. 29, 1978;

Derwent WPI; Title: Cont. Prodn. Alkali Metal or Ammonium persulphate—Using Zirconium (Alloy) Cathode & Bisulphite Solution; Assignee: Air Liquide Canada LTEE (CAAL); DE 2305381A; (no date).

*Primary Examiner*—Arun S. Phasge
*Attorney, Agent, or Firm*—Fulbright & Jaworkski, LLP

[57] ABSTRACT

The invention concerns the combined production of sodium peroxide disulphate and soda lye from sodium sulphate. According to the invention, electrolysis is carried out in at least one two-chamber electrolysis cell with cathode and anode chambers separated by a cation-exchanger membrane. The electrolysis temperature is set at between 30 and 70° C., a sodium sulphate solution which is at least 75% saturated at this temperature is introduced into the anode chamber, the sodium ion concentrations are maintained in the range of between 4.5 and 6.0 mol/l and soda lye is extracted from the cathode chamber.

24 Claims, 1 Drawing Sheet

PROCESS FOR THE COMBINED ELECTROCHEMICAL PRODUCTION OF SODIUM PEROXIDE DISULPHATE AND SODA LYE

This Application is a 371 of PCT/EP96/03596 filed Aug. 14, 1996.

Sodium peroxodisulphate is used in many ways in the chemical, metal-processing and electronic industries as a polymerization initiator, as etching and pickling agent and as an oxidizing and bleaching agent. To an increasing extent, it is also used in environmental technology, since, because of its high oxidation potential, it is able to break down many inorganic and organic pollutants oxidatively, and it can also be utilized for the extraction and recovery of metals from residues (e.g. electronics scrap) or from exhaust gases (e.g. mercury) because of its ability to dissolve metals. An oxidizing, bleaching, disinfecting and deodorizing agent has also been proposed, which comprises a liquid or solid mixture of peroxodisulphates with alkalis, in the application of which the peroxodisulphate is active in the alkaline range and the sulphuric acid formed in the reaction is completely or partially neutralized by the alkali component. Mixtures of peroxodisulphates with sodium carbonate and/or sodium percarbonate are particularly effective in this context.

Of the peroxodisulphates prepared on an industrial scale, sodium peroxodisulphate is the most important compound. Ammonium peroxodisulphate is increasingly being replaced because of the problems with ammonium. In comparison with potassium peroxodisulphate, there is the advantage of a substantially better solubility and the use as raw material of the cheaper sodium sulphate produced as waste product in industrial processes.

At the same time, however, of the three commercial peroxodisulphates, sodium peroxodisulphate is the most difficult to prepare directly electrochemically, since under comparable conditions only relatively low current efficiencies are achieved and the crystalline end product can only be crystallized out of the generally strongly acidic electrolyte solution with great difficulty in the form of sufficiently large easily filterable crystals.

Sodium peroxodisulphate is therefore to some extent still prepared indirectly electrochemically by reacting ammonium peroxodisulphate with sodium hydroxide solution in accordance with the overall equation $$(NH_4)_2S_2O_8 + 2\ NaOH \rightarrow Na_2S_2O_8 + 2\ NH_3 + 2\ H_2O.$$

The direct electrochemical preparation of sodium peroxodisulphate solutions in sulphuric acid proceeds in accordance with the overall equation

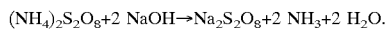

$$Na_2SO_4 + H_2SO_4 \xrightarrow{+/-\ 2e} Na_2S_2O_8 + H_2.$$

In this case, either undivided electrolysis cells are employed, or electrolysis cells divided by porous diaphragms or ion-exchange membranes are employed. In all cases, the anode material used is smooth platinum, usually applied to electrodes made of the valve metals tantalum or titanium. The cathodes used comprise lead, stainless steel or graphite material. As a result of the high solubility of the sodium peroxodisulphate, when undivided cells are used, generally only unsatisfactory current efficiencies around 50% are obtained, since some of the peroxodisulphate formed at the anode is reduced again at the cathode.

When divided electrolysis cells are used, in particular those having ion-exchange membranes as separators, with addition of substances increasing the potential, preferably sodium thiocyanate, with optimized electrolysis conditions and with favourable composition of the remaining electrolyte in strong sulphuric acid solution, current efficiencies up to greater than 70% are achieved. The conditions for a high current efficiency become more favourable with increasing sulphuric acid content, but the rate of the hydrolysis reaction to form peroxomonosulphuric acid also increases to the same extent, which in turn has an adverse effect on the current efficiency. To achieve such high current efficiencies, therefore, residence times as short as possible, low electrolysis temperatures and/or addition of selectively acting reducing agents are necessary under these conditions, in order to keep the steady-state concentration of peroxomonosulphate sufficiently low.

The cathode compartments are preferably charged with sulphuric acid, which accumulates owing to the electrochemical transfer of sodium ions into the cathode compartment with sodium sulphate and can therefore be used as anolyte after further saturation with sodium sulphate.

However, the use of cation-exchange membranes also makes it possible in principle to keep the cathode compartment alkaline and to obtain the transferred sodium ions as sodium hydroxide and remove it from the process as dilute sodium hydroxide solution. However, the yield of sodium hydroxide solution, based on the electrolysis current which flowed, is low and is at best a current efficiency of 30%. This is owing to the fact that to achieve a sufficiently high current efficiency of peroxodisulphate formation for the reasons mentioned, a high sulphuric acid content of 100 to 300 g/l in the anode compartment is considered to be indispensable, as a result of which, in combination with the high ion mobility of the H$^+$ ions, these take over the majority of mass transport through the cation-exchange membranes. The proportion of sodium hydroxide solution which can be prepared in this manner is therefore low and in no way justifies the higher cell voltage caused by the pH jump across the membrane.

On the other hand, decreasing the sulphuric acid content inevitably leads to a decrease in the current efficiency, since the solubility of the sodium sulphate then abruptly decreases and the sulphate ion concentration is no longer sufficiently high. Therefore, to date, it has also not been possible to prepare sodium peroxodisulphate according to the overall reaction to be sought in the ideal case

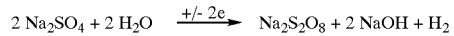

$$2\ Na_2SO_4 + 2\ H_2O \xrightarrow{+/-\ 2e} Na_2S_2O_8 + 2\ NaOH + H_2$$

from cheap sodium sulphate alone, in simple peroxodisulphate electrolysis cells divided in two, with economically justifiable low specific electrical energy consumptions.

On the basis of the combination of electrolysis and electrodialysis to split sodium sulphate into sodium hydroxide solution and sulphuric acid in an electrolysis cell divided into three (e.g. EP 0 257 523 B1) it has also already been proposed to prepare alkali metal peroxodisulphate or ammonium peroxodisulphate and alkali metal hydroxide in a three-chamber cell of this type having cation-exchange membranes arranged on the cathode side and anion-exchange membranes arranged on the anode side (DE-A 4426246, EP 0641871).

The use of a three-chamber cell has also already been proposed to prepare a sodium peroxodisulphate/sodium hydroxide oxidation solution of approximately stoichiometric composition for oxidative degradation of pollutants. In this case, the middle chamber, which is bounded on the cathode side by a cation-exchange membrane and on the anode side by an anion-exchange membrane, is kept approximately neutral by adding a saturated sodium sulphate solution. The proportion of sodium ions in the mass transport through the cation-exchange membrane is therefore sufficiently high. The. sodium sulphate solution exiting from the middle chamber then passes into the anode compartment, into which more sulphate ions pass from the middle chamber than are required for peroxodisulphate formation. A high concentration of sulphuric acid is thus established in the anode compartment, by which means the necessary conditions for relatively high current efficiencies greater than 60% can be created there. By mixing the anolyte effluent with the sodium hydroxide solution formed in the cathode compartment, the desired alkaline sodium peroxodisulphate solution of virtually stoichiometric composition and particularly suitable for pollutant degradation can then be obtained.

The disadvantages of such a procedure using a three-chamber cell are the electrical resistances of the additional middle chamber and the additional anion-exchange membrane, which lead to a considerable increase in the cell voltage and thus to a higher specific electrical energy consumption. In addition, there is the fact that the currently available anion-exchange membranes, which are in direct contact with the peroxodisulphate solution formed, are considerably less resistant to oxidation than the cation-exchange membranes, which leads to a more frequent cost-intensive membrane change. In addition to the high operating costs caused thereby, the procurement costs for a three-chamber cell of this type are markedly higher in comparison with a more simply constructed two-chamber cell. The other problems associated with the direct electrochemical preparation of sodium peroxodisulphate of a difficult purification of crystalline products from the peroxodisulphate solution having a high sulphuric acid concentration is not solved in any way by this process. For these reasons, a processing solution of this type is unsuitable for industrial use for the combined electrochemical preparation of sodium peroxodisulphate and sodium hydroxide solution.

The problem underlying the invention is to find novel solutions for a combined preparation process for sodium peroxodisulphate and sodium hydroxide solution, starting from sodium sulphate, which solutions can be implemented with sufficiently high current efficiency in electrolysis cells divided into two, which lead to high-concentration of sodium peroxodisulphate solutions which can be easily handled and can be easily further processed and which thus substantially avoid the disadvantages of the known preparation methods and, at the same time, enable the preparation of sodium hydroxide solution without the production of chlorine.

This problem is solved according to the invention by a process for the combined electrochemical preparation of sodium peroxodisulphate and sodium hydroxide solution from sodium sulphate, which is characterized in that an electrolysis is carried out in at least one two-chamber electrolysis cell having cathode and anode compartments divided by cation-exchange membrane, an electrolysis temperature of 30 to 70° C. is set, a sodium sulphate solution which is at least 75% saturated at this temperature is introduced into the anode compartment and the sodium concentrations are maintained in the range from 4.5 to 6.0 mol/l and sodium hydroxide solution is removed from the cathode compartment.

The sodium ion concentration is preferably maintained by subsequent dissolution of sodium sulphate and/or by evaporation of water. From the cathode compartment, a 10 to 40% strength sodium hydroxide solution is expediently removed, if appropriate by addition of water. The electrolysis is carried out in a single stage or in multiple stages, and the sodium sulphate solution fed to the anode compartment is preferably at least 90% saturated. The amount of sodium sulphate consumed in the course of the electrolysis reaction can either already be suspended in the electrolyte and/or, in the case of a multi-stage process procedure, the electrolyte can be saturated between the stages by means of crystalline sodium sulphate. In the case of a quantity of sodium sulphate suspended in the electrolyte, this is subsequently dissolved with increasing consumption of sodium sulphate and, during the overall electrolysis, a high sodium sulphate concentration corresponding to the saturation concentration at the respective anolyte composition is maintained.

A two-stage process procedure is particularly advantageous, in which, in the first electrolysis stage, the anolyte is circulated via a solution vessel for sodium sulphate and via the anode compartments of the electrolysis cell and in these steady-state circulating electrolytes, water and crystalline sodium sulphate are added in the required amounts. In this case, crystals or else mother liquors and wash liquids which also arise in the process can be fed to the solution vessel. A solution preferably containing up to 250 g/l of sodium peroxodisulphate, approximately saturated in sodium sulphate, is formed, which is fed to the second electrolysis stage. Here, further enrichment with sodium peroxodisulphate then takes place, with consumption of some of the dissolved sodium sulphate, until the desired final concentration is achieved.

The depletion in sodium sulphate proceeding during the electrolysis can also be particularly advantageously counteracted by an amount of water being evaporated which is necessary to maintain the sodium ion concentration to be kept to according to the invention.

Preferably, the proposed process is carried out in the temperature range from 40 to 60° C., in which the lowest specific electrical energy consumptions can be achieved. This relatively high electrolysis temperature preferably to be complied with of 40 to 60° C. also enables an economically advantageous removal of the Joule heat by vacuum evaporation by means of known processes, the desired saturation of the anolyte proceeding at the same time. By adding some of the condensate produced when the lost heat is removed, the sodium sulphate concentration can be set in the saturation concentration range and the sodium ion concentration can be set in the range from 4.5 to 6.0 mol/l.

In the process proposed, it was surprising that, when the approximately neutral saturated sodium sulphate solution is used as anolyte, when the electrolysis temperature is increased to the range 30 to 70° C. to be complied with according to the invention, preferably 40 to 60° C., the current efficiency markedly increases, completely in contrast to the prior knowledge.

This is all the more surprising, since it is known that the solubility of sodium sulphate passes through a maximum (32.2% by weight) at the conversion temperature of the decahydrate to be anhydrous salt of 32.38° C. This means, however, that at the temperatures preferably to be employed of 40 to 60° C., the solubility of the sodium sulphate is already becoming lower again. The solubility of the sodium sulphate also decreases further with the concentration of sodium peroxodisulphate which increases during the electrolysis, so that in the course of the electrolysis, the sodium sulphate concentration greatly decreases, despite the saturation performed according to the invention.

In a solution saturated in sodium peroxodisulphate, the solubility of the sodium sulphate also at first greatly increases with increasing temperature in the range from 10 to 29° C., and then decreases again. Nevertheless, the highest current efficiencies were obtained in the temperature range from 40 to 60° C. The specific electrical energy consumptions also pass through a minimum here, since the cell voltage decreases greatly, particularly in the temperature range from 30 to 50° C.

It has also been found that an important further precondition for a sufficiently high current efficiency for peroxodisulphate formation with simultaneous maintenance of only a low sulphuric acid content in the anolyte is a balanced participation of the sodium ions in the current transport. As is known, this can be influenced, in particular, by the selectivity of the cation-exchange membranes used, but also by the concentration of the sodium ions in the anolyte. It has been found that a concentration of 4.5 to 60 mol/l of sodium ions during the period of the electrolysis must be maintained in order to ensure, with the conventional cation-exchange membranes, the required transfer of sodium ions in the region of the maximally achievable anodic current efficiency. If, for example, fewer sodium ions pass through the membrane than sulphate ions are converted to peroxodisulphate at the anode, sulphuric acid is consumed in the anode compartment, the pH increases and the equilibrium potential of the anodic oxygen development decreases. As a result, the current efficiency of peroxodisulphate formation also decreases, until the transport number of the sodium ions has equalized.

Particularly in the initial phase of the electrolysis, at which high current efficiencies of peroxodisulphate are achieved, the addition of small amounts of acid up to 30 g/l can therefore be advantageous.

If, in contrast, by using a selective cation-exchange membrane, as is used for alkali-chlorine electrolysis, for example, the transport number of the sodium ions is considerably higher than the current efficiency of peroxodisulphate formation, sulphuric acid increasingly accumulates in the anode compartment. Hydrogen ions thus increasingly participate in the current transport through the membrane and the current efficiency of anodic peroxodisulphate formation also increases as a result of the increasing equilibrium potential of oxygen removal. The equilibrium state is then reached at a higher sul phuric acid content in the anolyte than when cation-exchange membranes of lower selectivity are used.

An excessive content of sulphuric acid, as can occur in particular in the case of high peroxodisulphate concentrations at the end of the electrolysis process, and in the case of a multi-stage process procedure, particularly in the last stage, however, again causes an excessive hydrolysis rate. However, the peroxomonosulphuric acid formed is known to lead to a reduction in current efficiency due to depolarization of the anodes. According to a further feature of the invention, this can be prevented by means of the fact that by recycling some of the sodium hydroxide solution produced at the cathode to the anolyte the pH of the anolyte is set to 0.5 to 2.

The sodium peroxodisulphate solution produced by the proposed method, depending on the final concentration of sodium peroxodisulphate, still sometimes contains considerable amounts of dissolved sodium sulphate, since high conversion rates, because of the residual sulphur contents which are then too low, can only be achieved in the case of a great decrease in current efficiency. With a multi-stage process procedure with addition of further amounts of sodium sulphate between the individual stages, typically, sodium peroxodisulphate solutions are obtained which, in addition to the desired approximately 200 to 550 g/l of sodium peroxodisulphate, further contain an excess of 70 g/l of sodium sulphate (at 550 g/l NaPS) to 250 g/l (at 200 g/l NaPS).

An essential precondition for the process procedure of the invention and applications for the sodium peroxodisulphate solutions obtained is the surprising behaviour which has been found of the solubility of the sodium peroxodisulphate in a solution saturated in sodium sulphate.

Whereas the great increase which was found in the solubility of sodium sulphate with temperature in the range from 10 to about 29° C. and its decrease after passing through the maximum at 29° C. was to be expected, it was completely surprising that the solubility of sodium peroxodisulphate, after a decrease to 29° C., greatly increased again in the claimed temperature range from 30 to 70° C. This gives the possibility, on the one hand of freeing the anolyte solution which is approximately saturated in both substances at the preferred working temperature of 40 to 60° C. from the majority of the dissolved sodium sulphate by cooling to 10 to 25° C., but on the other hand, merely by cooling to the solubility minimum for the sodium peroxodisulphate in the region of 30° C., of crystallizing out some of the sodium peroxodisulphate.

Thus, a substantial depletion of the sodium sulphate content from the sodium peroxodisulphate/sodium sulphate solution obtained by electrolysis can be achieved, by the fact that according to claim 7 the majority of the excess sodium sulphate is recovered by cooling-crystallization and recycled to the process. In this case also, sodium peroxodisulphate does not crystallize out if the final concentration reached in the electrolysis process of sodium peroxodisulphate has reached high values in the range from 400 to 450 g/l. The sodium sulphate recovered in the cooling-crystallization, possible "contaminated" sodium peroxodisulphate, can be recycled to the electrolysis process without any purification operations. It has been found that the residual content of sodium sulphate can be reduced in this manner to 30 to 60 g/l with cooling of the peroxodisulphate solution to 10 to 15° C. Since the sodium sulphate crystallizes out as decahydrate in this temperature range, water is also removed and an increase in the content of sodium peroxodisulphate further occurs.

To prepare a crystalline sodium peroxodisulphate from the anolyte solution obtained, in principle the following two methods are given by this solubility process:

1. The sodium peroxodisulphate is crystallized out, by cooling it to approximately 30° C., from the approximately saturated electrolysis solution which was obtained at 40 to 60° C. and worked up by known processes. Since in this case the solubility of sodium sulphate increases, sodium sulphate does not also crystallize out. After heating the resulting mother liquor to electrolysis temperature and saturation with sodium sulphate, the electrolysis process can be continued and thus a cyclic process can be started for preparing the crystalline sodium peroxodisulphate. However, the fact that the electrolysis has to be started with a very high concentration of sodium peroxodisulphate of approximately 410 g/l has an adverse effect on the achievable current efficiency in a cyclic process.

2. The crystalline sodium peroxodisulphate is obtained in the manner below from the solution which is approximately saturated in sodium peroxodisulphate and sodium sulphate and was obtained at 40 to 60° C.: by cooling to 10 to 25° C., the majority of the excess sodium sulphate is first separated out, the sodium peroxodisulphate content further increasing. The solution is then concentrated in a vacuum crystallizer to about saturation concentration of the remaining sodium sulphate and the peroxodisulphate crystallized out at the solubility minimum around 30° C. Since sodium sulphate reaches the solubility maximum at this temperature, sodium sulphate does not also crystallize out during this. The mother liquor obtained after separating off crystalline sodium peroxodisulphate roughly corresponds in composition to the anolyte solution exiting from the electrolysis and can be added to this prior to removal of the sodium sulphate. The electrolysis itself can therefore always be begun with freshly prepared sodium sulphate solution, for which reason markedly higher current efficiencies are achievable as in the case of the first variant.

On the other hand, obviously, many potential applications also result for the highly concentrated sodium peroxodisulphate solutions obtained in the electrolysis process, without having to proceed via the crystalline peroxodisulphate. In this case, prior to use, the majority of the excess sodium sulphate can be removed again by cooling it to 10 to 25° C. However, for some applications this is not absolutely necessary. For example, the alkaline peroxodisulphate solutions serving for use as bleaching and oxidizing solutions, e.g. for pollutant breakdown in environmental technology, can be prepared in a simple manner in situ by mixing the anolyte with the catholyte at the cell outlet. Owing to the "dilution" of the anolyte thus occurring, even with intermediate storage and cooling to room temperature, sodium sulphate does not crystallize out.

Another possible method of workup is evaporation of the resulting sodium peroxodisulphate solutions to dryness with the aim of preparing a solid, preferably granulated, peroxodisulphate concentrate, with or without prior depletion of the sodium sulphate. Products of this type can be prepared by spray-drying and particularly by spraying the solution under drying conditions onto a fluidized bed of granules of the resulting solid. The active compound concentrate thus obtained may be used advantageously, since they can be prepared more inexpensively, in place of the pure crystalline sodium peroxodisulphate, particularly for applications in environmental technology.

However, the electrochemically formed highly concentrated sodium peroxodisulphate solutions can also be sprayed onto granules of other substances under drying conditions. When alkaline based materials are used, for example sodium carbonate, a solid alkaline active compound mixture is obtained as can be used advantageously for pollutant breakdown in process solutions and waste waters. If, according to a further feature of the invention, use is made of sodium percarbonate as granules to be sprayed, the active compound combination known per se of sodium peroxodisulphate and sodium percarbonate is obtained. In the preparation according to the invention from the electrochemically generated highly concentrated approximately neutral sodium peroxodisulphate solution, the advantages below result in comparison to the preparation by mixing the solid components:

1. This active compound combination may be prepared substantially more inexpensively, since the sodium peroxodisulphate solution can be used without complex purification operations and without crystallization and drying processes.
2. Surprisingly, the concentration of the peroxodisulphate component in the outer layer of the granules formed shields the more sensitive sodium percarbonate which is concentrated in the core from the actions of catalytically active other constituents of washing and cleaning agents of complex composition. It has been found that a highly resistant, coated percarbonate can be prepared in this manner for varied applications. In this case, neither a proportion of sodium sulphate in the coat layer, nor a proportion of sodium carbonate in the core region of the granules formed is an interference.

It has further been found that the sodium hydroxide solution formed at the cathode can be reacted even in the cathode compartments with reaction partners which are added or formed at the cathode to give secondary products. In comparison with a downstream reaction, this can be associated with a number of advantages. On the one hand, this reaction can have positive consequences on the entire electrolysis process directly in the catholyte, e.g. by influencing the transfer of the various ions through the membranes. On the other hand, the inclusion of the actual cathode process, without needing to employ additional electrolysis current, can lead to completely different potential reactions, such as cannot be achieved in a downstream reaction process or which cannot be achieved with the same economic efficiency.

Thus, it has been found that the secondary products sodium carbonate or sodium bicarbonate can advantageously be prepared by introducing carbon dioxide into the catholyte. In comparison with a downstream reaction of the resulting sodium hydroxide solution, the hydroxyl ion concentration in the cathode compartment is decreased by this means. As a result, back-diffusion of hydroxyl ions into the anode compartment, which, at relatively high sodium hydroxide concentrations, acts to decrease current efficiency, is suppressed.

Another valuable secondary product which can be prepared by the process is an alkaline sodium peroxide solution which can be used for bleaching paper and pulp. It is formed if, instead of the hydrogen development of the cathode, and oxygen reduction to hydrogen peroxide is performed by using a gas-consumption electrode known per se, e.g. an oxygen-diffusion electrode or a gas-flushed carbon electrode having high surface area and activity. Since this reaction proceeds in alkaline solution, the sodium hydroxide solution formed at the cathode can be utilized highly advantageously, because it is inexpensive, for this secondary product. Depolarization of the cathode, moreover, further decreases the electrolysis current consumption. Exploiting the relatively low solubility of the sodium peroxide octahydrate also crystallizes this out from the cathode solution. An advantageous combination is also mixing an alkaline hydrogen peroxide solution of this type with the sodium peroxodisulphate solution formed at the anode. A highly active alkaline oxidation solution is obtained in this manner which contains the active compound mixture peroxodisulphate/ hydrogen peroxide which is suitable for pollutant degradation and for bleaching processes.

In summary, the proposed process gives the advantages below in comparison with the prior art in the preparation of sodium peroxodisulphate:

The starting material is solely sodium sulphate which is produced as a coupled product in industrial processes.

High final concentrations of sodium peroxodisulphate of 400 to 500 g/l are possible.

Since the electrolysis only proceeds in a weak acidic range, the hydrolysis to form peroxomonosulphate is not important, there is therefore no restriction on the residence time and no reducing additives are necessary to keep the steady-state concentration of peroxomonosulphuric acid low.

It is readily possible to crystallize out the majority of the unreacted sodium sulphate as the decahydrate by cooling to 10 to 20° C. and, by this means, at the same time to concentrate further the peroxodisulphate solution.

However, it is also possible to crystallize out pure sodium peroxodisulphate from the highly concentrated solutions at the solubility minimum of 28 to 30° C. Since this crystallization proceeds from an approximately neutral solution, no additional cost-intensive operations are required for purification or for crystal enlargement (recrystallization).

The high electrolysis temperature of preferably 40 to 60° C. permits a favourable removal of the Joule heat by vacuum evaporation, by which means, at the same time, a reduction in volume can be achieved to maintain the required sodium ion concentration of 5 to 6 mol/l.

The high purity and concentration of electrochemically generated sodium peroxodisulphate solution achievable permits a variety of applications, without needing it to crystallize out the peroxodisulphate in advance. Novel applications can be developed as a result and known ones can be made more economicalal (e.g. bleaches for paper and pulp, in-situ preparation of polymerization initiators).

The highly concentrated sodium peroxide [sic] solution is also suitable for the cost-effective preparation of solid concentrates by spray-drying, material composites which are suitable as oxidizing and bleaching agents, e.g. with sodium percarbonate, also readily being able to be prepared.

By reacting the sodium hydroxide solution formed at the cathode with reaction partner added to the catholyte or formed by the cathode reaction to give secondary products it is possible to achieve positive consequences for the electrolysis process or to exploit conjointly the cathode process in an advantageous manner for the economical preparation of secondary products of this type.

BRIEF DESCRIPTION OF THE DRAWING

An experimental arrangement of a two-stage electrolysis process to prepare a sodium peroxodisulphate solution is shown diagrammatically in FIG. 1.

USE EXAMPLES

Example 1

Figure 1:
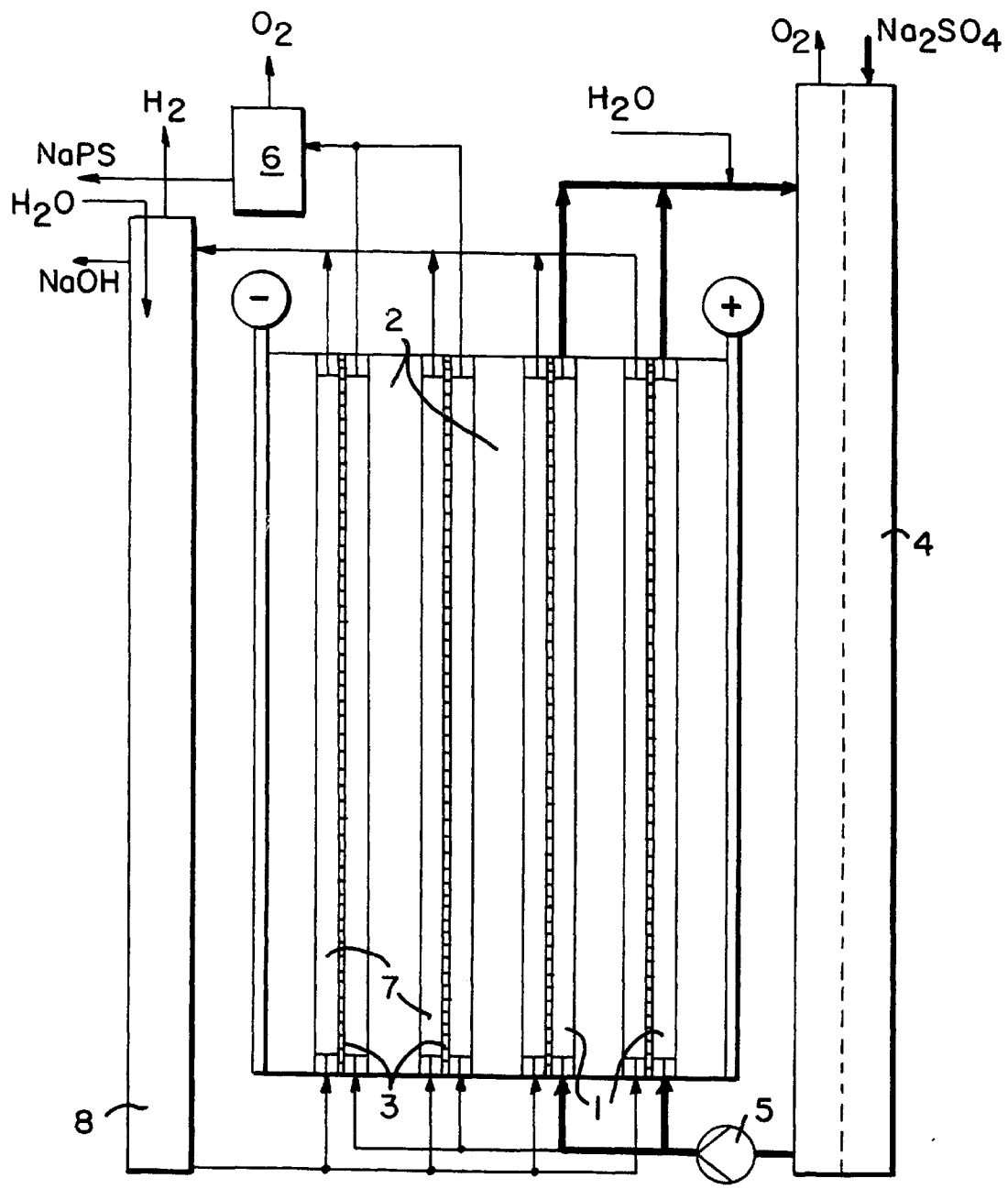

The electrolysis cell used, which was divided into two and comprised four bipolar individual cells, was designed as a gas-lift cell and had an optimal height for this of 2 m. Two individual cells were each assigned to the two electrolysis stages I and II and the anolyte in question flowed through the anode compartments 1 in parallel. The electrode plates 2 contained anodes made of smooth platinum on electrodes of tantalum and cathodes of stainless steel. Cation-exchange membranes of the Nafion type acted as separators 3. The four individual cells were each operated at 150 A electrolysis current. The anodic current density was 5 kA/m$^2$, and the cathodic current density was 2 kA/m$^2$. The anolyte was kept at approximately 45° C. by internal cooling.

In the first electrolysis stage, a circulating anolyte was circulated by the pump 5 via the anode compartments 1 and an external solution vessel 4 with feed of sodium sulphate. Into this anolyte circuit was fed only water to which sodium thiocyanate was added as a potential-increasing additive in an amount of 0.15 g/l. The circulating electrolyte passing over into the second electrolysis stage, which was approximately saturated in sodium sulphate (340 g/l) at the electrolysis temperature of 45° C. and which contained about 118 g/l of sodium peroxodisulphate, then flowed through the anode compartments of the second electrolysis stage II. The sodium sulphate content was depleted by about 125 g/l by the peroxodisulphate formation and by the passage of sodium ions through the cation-exchange membrane, while the content of sodium peroxodisulphate increased to approximately 225 g/l. The concentration of the sodium ions was 4.9 mol/l. The volumetric flow rate of anolyte exiting from the gas separator 6 was 8.1 l/h. A sodium hydroxide solution with a content of 170 g/l acted as catholyte. This was circulated by means of gas lift via all four cathode compartments 7 connected in parallel and the catholyte vessel 8. Water was continuously added to this catholyte circuit at a rate such that the sodium hydroxide solution exiting at the overflow had a concentration in the range from 150 to 200 g/l (range of the conductivity maximum). A current efficiency of NaPS formation was calculated to be 68.4%. About the same value was given for the current efficiency of sodium hydroxide solution formation. The exiting anolyte contained only small amounts of sulphuric acid (approximately 3 g/l), so that in accordance with the reaction formula, for each mole of peroxodisulphate, approximately 2 mol of sodium hydroxide were formed. The cell voltage was 6.1 V, from which was calculated a specific direct current consumption, based on the sodium peroxodisulphate obtained, of 2.01 kWh/kg.

Example 2

To prepare an approximately stoichiometrically composed alkaline sodium peroxodisulphate solution, the experiment according to Example 1 was repeated and the exiting anolyte was directly incorporated into the overflow of the catholyte circuit. 11.6 l/h resulted of a stoichiometrically composed alkaline oxidation solution which was suitable for pollutant degradation and had a content of sodium peroxodisulphate of 157 g/l and of sodium hydroxide of 53 g/l.

Example 3

To prepare an aqueous solution of sodium peroxodisulphate depleted in sodium sulphate (suitable, e.g., as initiator solution for polymerization processes), the anolyte originating from Example 1 was cooled with stirring to approximately 10° C. The resulting crystal paste of Glauber's-salt (decahydrate) was filtered off via a frit. The filtrate, at 331 g/l, had a higher sodium peroxodisulphate content than the starting solution, due to the removal of water for crystal formation. The content of excess sodium sulphate was only 61 g/l. Based on the reaction formula, this composition corresponds to an approximately 87% degree of conversion of the sodium sulphate. The sodium sulphate separated off can be recycled (solution vessel) to the electrolysis process without additional purification operation (washing with water). Neither the water balance nor the yield of sodium peroxodisulphate were adversely affected by the amount of water and the recycled amounts of sodium sulphate and sodium peroxodisulphate being included in the overall balance (lower addition of sodium sulphate and water, somewhat higher final concentration of sodium peroxodisulphate).

Example 4

The sodium peroxodisulphate solution obtained in Example 3 which is depleted in sodium sulphate was mixed with the sodium hydroxide solution formed at the cathode in Experiment 1 in a volumetric ratio of 1:0.64. This gave an alkaline peroxodisulphate solution suitable for pollutant gradation in process solutions and waste waters having the composition 201 g/l of sodium peroxodisulphate, 68 g/l of NaOH and 38 g/l of sodium sulphate. The molar ratio NaOH/NaPS was 2.01; the solution was therefore approximately of stoichiometric composition.

Example 5

The apparatus used in Example 1 was changed to the extent that only the two individual cells of the first electrolysis stage were used; the current capacity was thus decreased to 2×150 A. 7.7 l/h of a mother liquor which was saturated in sodium peroxodisulphate and approximately saturated in sodium sulphate at approximately 30° C. were added to the anolyte circuit conducted via the solution vessel. The electrolysis was run at a tem perature of about 45° C. The catholyte circulation was left as in Example 1. Water was continuously added to the circulating catholyte containing approximately 170 g/l NaOH. A peroxodisulphate solution (approximately 5.5 mol/l sodium ion concentration) enriched with sodium peroxodisulphate to 460 g/l and depleted in sodium sulphate to 111 g/l exited from the anode compartments. This corresponds to a current efficiency of 57.8%. 5 l of the solution obtained were collected in a glass stirred vessel heated to 30° C. and admixed with 600 g of sodium sulphate. After a stirring time of 30 min, the excess solute was filtered off via a frit, washed 4×15 with 50 ml of water each time, dried and the amount and sodium peroxodisulphate content were determined. 405 g of a 98.5% pure sodium peroxodisulphate were obtained. 210 ml of washed liquid were produced having a NaPS content of 480 g/l. The mother liquor obtained corresponded in composition to that used for the electrolysis. A continuous cyclic process is thus possible for preparing crystalline sodium peroxodisulphate. The cell voltage was 6.3 V. From this was calculated a specific direct current consumption of 2.45 kWh/kg.

Example 6

With the experimental apparatus described in Example 1, under otherwise identical conditions, an aqueous solution containing 20 g/l of sulphuric acid was fed into the anolyte circuit in place of the water used in Example 1. The anolyte exiting from the second electrolysis stage contained 253 g/l of sodium peroxodisulphate. The sulphuric acid content had decreased to 14 g/l. The exiting volumetric flow rate was measured at 8.0 l/h. Some of the sulphuric acid introduced was therefore consumed, which gave a current efficiency increased by 4.3%, in comparison with Example 1, to 72.7%. The cell voltage of 6.1 V gave a specific direct current consumption of 1.89 kWh/kg.

Example 7

The experimental apparatus used in Example 5 was modified such that the anolyte solution is circulated batchwise via a storage vessel. At the same time, sodium sulphate was added to this storage vessel, so that a proportion was always present as excess solute and thus as much sodium sulphate was subsequently dissolved as was converted in the electrolysis process. The starting solution was a neutral solution which was saturated in sodium sulphate at the electrolysis temperature of approximately 45° C., which again contained approximately 0.15 g/l of sodium thiocyanate. The electrolysis was run over the course of 5 hours at 2×150 A. On the cathode side, a sodium hydroxide solution was removed having a content of 175 g/l. The cell voltage was 6.3 V. After the end of electrolysis, 10.5 l of a solution containing 428 g/l of sodium peroxodisulphate were withdrawn from the anolyte circuit, which solution additionally contained 153 g/l of sodium sulphate and only 3 g/l of sulphuric acid (current efficiency 67.5%, specific electrical energy consumption 2.1 kWh/kg).

Example 8

The electrolysis was carried out batchwise in accordance with Example 7 under otherwise identical conditions, but with altered electrolysis temperatures of 30, 35, 40, 50, 55 and 60° C. The results obtained after an electrolysis period of 5 hours are summarized in the table (including the results of Example 7).

| Electrolysis Temperature ° C. | Anolyte Volume l | NaPS Concentration g/l | Cell Voltage V | Current Efficiency % | Specific Electrical Energy Consumption kWh/kg |
|---|---|---|---|---|---|
| 30 | 10.5 | 390 | 7.3 | 61.0 | 2.70 |
| 35 | 10.5 | 400 | 7.2 | 63.0 | 2.57 |
| 40 | 10.5 | 422 | 6.6 | 66.5 | 2.24 |
| 45 | 10.5 | 428 | 6.3 | 67.5 | 2.10 |
| 50 | 10.5 | 432 | 6.2 | 68.1 | 2.05 |
| 55 | 10.4 | 420 | 6.1 | 65.5 | 2.10 |
| 60 | 10.1 | 400 | 6.0 | 60.7 | 2.23 |

Under these conditions, therefore, the highest current efficiencies and, especially, the lowest specific electrical energy consumptions, were therefore obtained at 50° C.

Example 9

The highly concentrated sodium peroxodisulphate/sodium sulphate solutions obtained in Examples 7 and 8 were sprayed into a fluidized-bed granulater with simultaneous water evaporation, granules having a particle size in the range from 0.2 to 0.6 mm and a sodium peroxodisulphate content of approximately 73% being obtained. These granules may be used in varied ways as oxidizing, bleaching, disinfecting and detoxifying agents, instead of pure crystalline sodium peroxodisulphate. Example 10

The highly concentrated sodium peroxodisulphate/sodium sulphate solutions obtained in Examples 7 and 8 were sprayed on to crystalline sodium carbonate with simultaneous evaporation of water in a fluidized-bed apparatus. Granules were obtained which comprised 25.1% of sodium carbonate, 56.6% of sodium peroxodisulphate and 18.7% of sodium sulphate. These granules were of approximate stoichiometric composition with respect to the content of sodium peroxodisulphate and sodium carbonate and can be used as active oxidizing, bleaching and detoxifying agents.

Example 11

With the same experimental arrangement as in Example 7, 10 l of a sodium sulphate solution saturated at 40° C. containing 420 g/l (5.9 mol/l of $Na^+$) and an addition of 0.15 g/l of sodium thiocyanate were circulated via the anode compartments by pumping. The electrolysis temperature was set at approximately 50° C. In addition, a vacuum evaporator was connected into this circuit, which evaporated about 1.1 l of water per hour. Electrolysis was again run with 2×150 A, but only for the course of 3 hours. 6.8 l of a highly concentrated solution were obtained which contained 401 g/l of sodium peroxodisulphate, 142 g/l of sodium sulphate and approximately 3 g/l of sulphuric acid (5.4 mol/l of $Na^+$). This corresponds to a current efficiency of peroxodisulphate formation of 68.2%. 5.1 l of a sodium hydroxide solution containing 178 g/l were removed at the cathode (68.6% yield).

Example 12

The solution obtained in Example 11 was cooled to 15° C. and the majority of the sodium sulphate was crystallized out as the decahydrate. The solution separated out contained 488 g/l of sodium peroxodisulphate and 61 g/l of sodium sulphate. This composition corresponds to a conversion rate of approximately 91%. A solution of this type is suitable for many types of applications, e.g. also as a polymerization initiator which can be prepared in situ.

Example 13

The peroxodisulphate solution prepared according to Example 11 and depleted in sodium sulphate according to Example 12 was concentrated in a vacuum crystallizer to approximately ⅓ of the initial volume and the sodium peroxodisulphate was crystallized out at 30° C. The crystal paste was filtered of via a frit and washed repeatedly with a sparing amount of water. After drying had been completed, a sodium peroxodisulphate content of 99.2% was determined. The mother liquor separated off had a sodium peroxodisulphate content of 375 g/l and a sodium sulphate content of 184 g/l. In a continuous preparation process, the mother liquor can be recycled to the anolyte solution prior to the depletion in sodium sulphate by cooling.

Example 14

The experiment according to Example 8 at 55° C. was repeated, but the electrolysis was continued over a period of 7 h. 10.0 l of the anolyte solution were obtained having an extremely high concentration of sodium peroxodisulphate of 576 g/l (spontaneous crystallizing out occurred even during discharge). This still corresponded to a current efficiency of 61.8%. The sulphuric acid concentration increased greatly at the end of the electrolysis. By recycling a small part of the sodium hydroxide solution formed at the cathode, the pH was kept to 1 to 1.5. The mean cell voltage was on average 6.2% [sic]. This gives a specific direct current consumption of 2.26 kWh/kg.

The first 5 liters of the discharged anolyte were cooled with stirring to approximately 30° C., some of the peroxodisulphate being crystallized out in the course of this. The crystal paste was filtered off via a frit and washed repeatedly with a solution saturated in sodium peroxodisulphate at 30° C. and again filtered off by suction to dryness. After drying, 880 g of sodium peroxodisulphate were obtained having a content of 99.2%

The second 5 liters of the anolyte were concentrated in a vacuum evaporator to about 3 liters and kept at 30° C. The crystal paste obtained was worked up in the same way as in the first part of the experiment. 1510 g of sodium peroxodisulphate having a content of 99.3% were obtained. The mother liquor separated off, in addition to 420 g/l of sodium peroxodisulphate, also contained 137 g/l of sodium sulphate.

Example 15

A real process solution from the chemical industry contained 96 mg/l AOX, present in particular in the form of toxic chlorinated phenols. The TOC content was determined to be approximately 500 mg/l. In addition, 800 mg/l of chlorides were present. 10 l of this waste water were mixed with 1 l of the alkaline sodium persulphate solution from Example 4 and reacted at 80° C. Despite the excess of chloride and other nontoxic organic compounds, the AOX content could be reduced within 2 hours to 3 mg/l, corresponding to a degradation rate of 98%.

Example 16

The drilling-coolant emulsion used for metal machinery, after a pretreatment by ultrafiltration, had a TOC content of 4.1 g/l (11.2 g/l of COD). 600 ml of this process solution were mixed with 400 ml of the alkaline sodium peroxodisulphate solution from Example 4 and reacted at 80% C over the course of 3 hours. The TOC content decreased to 1.2 g/l, corresponding to a degradation rate of 70.7%. The COD content had even decreased to 1.9 g/l, corresponding to a degradation rate of 83%. The residual organic matter was therefore present in a more highly oxidized, more readily biodegradable form. The solution obtained was approximately neutral (pH 5.5). The sulphuric acid formed in the peroxodisulphate reaction was therefore neutralized by the sodium hydroxide solution.

Example 17

The following example illustrates the formation of alkaline sodium peroxide bleaching solution by reacting the sodium hydroxide solution formed with hydrogen peroxide obtained at the cathode by oxygen reduction. A membrane laboratory cell was operated with separate anolyte/catholyte circuits. The cathode comprised an activated carbon felt which was stuck to a graphite plate furnished vertically with ridges. The geometric surface area of the graphite plate was 150 $cm^2$. The anode used was a platinum foil on titanium support material having a surface area of 50 $cm^2$. The electrolysis was performed at a current of 25 A, corresponding to anodic current density of 0.5 $A/cm^2$, whereas the cathodic current density was at only 0.17 $A/cm^2$, based on the surface area of the graphite plate.

The electrolyte circuits were each circulated at approximately 400 l/h by means of centrifugal pumps. By means of a heat exchanger in the catholyte circuit, the catholyte temperature was set to approximately 30° C.; a temperature of approximately 40° C. established itself in the anolyte circuit. The catholyte circulation was arranged in such a manner that the electrolyte was passed via the grooves between the graphite ridges and flowed through the activated carbon felt into the cell interior. Upstream of the graphite plate, oxygen was fed via a frit to the electrolyte, in order to keep the catholyte permanently saturated in oxygen. The oxygen formed at the anode was also incorporated into this oxygen feed.

Water was added to the catholyte circuit; approximately 320 ml/h of the catholyte solution having a sodium hydroxide concentration of 84.3 g/l and a hydrogen peroxide concentration of 31.3 g/l continuously flowed over from the catholyte circuit, corresponding to a current efficiency of 63.2%.

The anolyte circuit was conducted via a solution vessel containing sodium sulphate as excess solute. Water, admixed with about 0.5 g/l of sodium thiocyanate, was likewise added to the anolyte circuit. Approximately 350 ml/h of the anolyte solution approximately saturated in sodium sulphate continuously flowed over from the anolyte circuit. This anolyte solution contained on average 212 g/l of sodium peroxodisulphate and approximately 7 g/l of sulphuric acid. The current efficiency of peroxodisulphate formation was 66.8%.

By mixing anolyte and catholyte, approximately 665 ml/h of an alkaline oxidizing and bleaching solution were obtained containing 110 g/l (0.46 mol/l) of sodium peroxodisulphate, 15 g/l (0.44 mol/l) of hydrogen peroxide and 38 g/l (0.95 mol/l) of sodium hydroxide.

We claim:

1. A process of the combined preparation of sodium peroxodisulphate and sodium hydroxide solution from sodium sulphate, wherein an electrolysis is carried out in at least one two-chamber electrolysis cell having cathode and anode compartments divided by a cation exchange membrane, an electrolysis temperature of 30 to 70° C. is set, a sodium sulphate solution at least 75% saturated at this temperature is introduced into the anode compartment and the sodium ion concentrations are maintained in the range of from 4.5 to 6.0 mol/l and sodium hydroxide solution is removed from the cathode compartment.

2. The process of claim 1, wherein the sodium ion concentration is maintained by subsequent dissolution of sodium sulphate, by evaporation of water, or both.

3. The process of claim 1, wherein a 10 to 40% strength sodium hydroxide solution is removed from the cathode compartment, if appropriate by addition of water.

4. The process of claim 1, wherein the electrolysis is carried out in a single stage or in multiple stages.

5. The process of claim 1, wherein the sodium sulphate solution fed to the anode compartment is at least 90% saturated.

6. The process of claim 5, wherein the amount of crystalline sodium sulphate suspended in the electrolyte is that consumed in the course of the electrolysis, so that, by means of subsequent dissolution, the procedure is always carried out in the saturation range.

7. The process of claim 1, wherein, in the case of a multi-stage electrolysis, the electrolyte is saturated with crystalline sodium sulphate between the stages.

8. The process of claim 1, wherein, in the case of a two-stage process procedure, in the first electrolysis stage, the anolyte is circulated via a solution vessel for sodium sulphate and via the anode compartments and water, crystalline sodium sulphate and, if appropriate, crystals or mother liquors which are produced in the process and contain sodium sulphate and sodium peroxodisulphate are introduced into this steady-state circulating electrolyte, while the overflow anolyte which is approximately saturated in sodium sulphate and contains up to 250 g/l of sodium peroxodisulphate is fed to the anode compartments of the downstream electrolysis stage.

9. The process of claim 1, wherein electrolysis is carried out at temperatures of 40 to 60° C.

10. The process of claim 1, wherein a pH of between 0.5 and 2.0 is set in the anolyte circuit by recycling some of the sodium hydroxide solution formed at the cathode.

11. The process of claim 1, wherein, in the sodium peroxodisulphate solution obtained, the majority of excess sodium sulphate is crystallized out as Glauber's salt by cooling to 10 to 25° C., separated off and recycled to the electrolysis process.

12. The process of claim 1, wherein, to prepare an approximately stoichiometrically composed alkaline sodium peroxodisulphate solution, the anolyte solution is mixed with the catholyte solution, directly or after previous depletion in sodium sulphate.

13. The process of claim 1, wherein crystalline sodium peroxodisulphate is prepared and further wherein an anolyte solution which is approximately saturated in sodium peroxodisulphate is prepared and obtained at 40 to 60° C., optionally with addition of 100 to 200 g/l of solid sodium sulphate, is cooled to approximately 30° C., the sodium peroxodisulphate crystallizing out in this process is separated off and the mother liquor is recycled to the electrolysis.

14. The process of claim 1, wherein, crystalline sodium peroxodisulphate is prepared by freeing a sodium peroxodisulphate/sodium sulphate solution obtained at 40 to 60° C. of the majority of the excess sodium sulphate by cooling to 15 to 25° C., then concentrating to 90 to 30% of the initial volume and some of the sodium peroxodisulphate is crystallized out at temperatures between 25 and 35° C. and worked up by known processes, while the mother liquor is recycled to the process downstream of the electrolysis.

15. The process of claim 1, wherein the heat lost at the electrolysis temperature is used to concentrate the peroxodisulphate solution.

16. The process of claim 1, wherein a sodium peroxodisulphate/sodium sulphate solution obtained at 40 to 60° C. is worked up by complete evaporation of water, in particular by spray-drying or in the fluidized bed, to give a granulated oxidizing and bleaching agent based on sodium peroxodisulphate.

17. The process of claim 1, wherein a sodium peroxodisulphate/sodium sulphate solution obtained at 40 to 60° C. is sprayed onto a base substance with evaporation of water to produce a solid active compound mixture.

18. The process of claim 17, wherein said base substance is in granulated form.

19. The process of claim 17, wherein said base substance is kept in a fluidized bed.

20. The process of claim 17, wherein said base substance present in granulated form comprises sodium carbonate.

21. The process of claim 17, wherein said granulated base substance comprises sodium percarbonate.

22. The process of claim 1, wherein the sodium hydroxide solution formed at the cathode is reacted even in the cathode compartments with added reaction partners or reaction partners formed at the cathode to give secondary products.

23. The process of claim 22, wherein the sodium hydroxide solution formed at the cathode is reacted to give the secondary products sodium carbonate or sodium bicarbonate by introducing carbon dioxide into the catholyte.

24. The process of claim 22, wherein an alkaline sodium peroxide bleaching solution is formed as secondary product by feeding oxygen and its cathodic reduction to hydrogen peroxide with the sodium hydroxide solution formed.

* * * * *

UNITED STATES PATENT AND TRADEMARK OFFICE
CERTIFICATE OF CORRECTION

PATENT NO. : 5,958,208
DATED : Sep. 28, 1999
INVENTOR(S) : Thiele, et al.

It is certified that error appears in the above-identified patent and that said Letters Patent is hereby corrected as shown below:

In column 11, line 33, change "4x 15 with 50 ml" to -- 4x with 50 ml --.

In column 5, line 45, delete space in the middle of " sul phuric" to -- sulphuric --.

In column 11, line 21, change "tem perature" to -- temperature --.
In column 12, line 62, change "Example 10" should be centered as a heading instead of part of the paragraph.

Signed and Sealed this

Seventeenth Day of October, 2000

Attest:

Q. TODD DICKINSON

*Attesting Officer*  *Director of Patents and Trademarks*